US009720703B2

(12) United States Patent
Reick et al.

(10) Patent No.: US 9,720,703 B2
(45) Date of Patent: *Aug. 1, 2017

(54) DATA DRIVEN HARDWARE CHIPS INITIALIZATION VIA HARDWARE PROCEDURE FRAMEWORK

(71) Applicant: INTERNATIONAL BUSINESS MACHINES CORPORATION, Armonk, NY (US)

(72) Inventors: Kevin Franklin Reick, Round Rock, TX (US); David Dean Sanner, Rochester, MN (US); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 13/685,702

(22) Filed: Nov. 26, 2012

(65) Prior Publication Data

US 2014/0149728 A1    May 29, 2014

(51) Int. Cl.
G06F 9/44    (2006.01)
G06F 9/445    (2006.01)

(52) U.S. Cl.
CPC ............ G06F 9/4436 (2013.01); G06F 8/665 (2013.01); G06F 9/4403 (2013.01)

(58) Field of Classification Search
CPC .................................................. G06F 9/44

(Continued)

(56) References Cited

U.S. PATENT DOCUMENTS 5,652,906 A    7/1997    Kadosumi et al.
6,882,711 B1 *  4/2005    Nicol .......................... 379/93.33
(Continued)

FOREIGN PATENT DOCUMENTS

JP    2000-187533    7/2000

OTHER PUBLICATIONS

Collins, Gary, Final Office Action, U.S. Appl. No. 13/781,422, The United States Patent and Trademark Office, Oct. 22, 2015, pp. 1-18.
(Continued)

*Primary Examiner* — Thomas Lee
*Assistant Examiner* — Gary Collins
(74) *Attorney, Agent, or Firm* — Yudell Isidore PLLC

(57) ABSTRACT

A system and computer program product provide processor initialization in different platform environments via a single code set. The system includes: in response to detecting a power-on operation of the processor, a microcontroller retrieving hardware procedures (HWP) framework code from a storage and triggering execution of the HWP framework code on the processor. The execution of the HWP framework code generates a HWP framework that comprises a plurality of application programming interfaces (APIs) which govern how all communication processes involving hardware procedures can be accomplished. The system further includes the microcontroller performing one or more initialization procedures by communicating one or more attribute data via the HWP framework to configure the processor for operation within a specific platform environment in which the processor is to be operated. The HWP framework includes standard interfaces and enables direct updates to hardware procedures without requiring a new flash code or a firmware patch.

20 Claims, 9 Drawing Sheets

(58) Field of Classification Search
USPC .......................................... 713/1, 2; 710/10
See application file for complete search history.

(56) References Cited

U.S. PATENT DOCUMENTS

| | | | |
|---|---|---|---|
| 7,165,170 B2 | 1/2007 | Rothman et al. | |
| 7,263,605 B2 | 8/2007 | Rothman et al. | |
| 7,590,835 B1* | 9/2009 | Nallagatla et al. | ................ 713/1 |
| 8,370,618 B1* | 2/2013 | Yakovlev | .............. G06F 13/102 709/222 |
| 2003/0056090 A1* | 3/2003 | Khanna et al. | .................... 713/1 |
| 2003/0154368 A1* | 8/2003 | Stevens, Jr. | ........... G06F 9/4401 713/1 |
| 2004/0162978 A1* | 8/2004 | Reasor | ................ G06F 11/1417 713/2 |
| 2004/0255109 A1* | 12/2004 | Nakajima | ......................... 713/1 |
| 2004/0268107 A1* | 12/2004 | Zimmer | ................ G06F 9/4411 713/1 |
| 2005/0160159 A1 | 7/2005 | Zimmer et al. | |
| 2011/0231640 A1* | 9/2011 | Avadhanam | ..................... 713/2 |
| 2011/0289305 A1* | 11/2011 | Zimmer | .................. G06F 21/44 713/1 |
| 2011/0320798 A1* | 12/2011 | Zimmer | .................. G06F 21/14 713/2 |
| 2012/0023318 A1* | 1/2012 | Xing | ..................... G06F 9/4403 713/2 |

OTHER PUBLICATIONS

Collins, Gary, Non-Final Office Action, U.S. Appl. No. 13/781,422, The United States Patent and Trademark Office, May 4, 2016, pp. 1-21 (relevant pp. 1-21).

Collins, Gary, Final Office Action, U.S. Appl. No. 13/781,422, The United States Patent and Trademark Office, Nov. 16, 2016, relevant pp. 1-18.

* cited by examiner

DATA DRIVEN HARDWARE CHIPS INITIALIZATION VIA HARDWARE PROCEDURE FRAMEWORK

BACKGROUND

1. Technical Field

The present disclosure generally relates to data processing systems. More specifically, the present disclosure relates to communication processes for hardware initialization within data processing systems.

2. Description of the Related Art

The design, development, and implementation of processor chips for utilization in data processing systems require firmware initialization of various settings of the processors and/or the embedded cores. For example initialization of settings such as chicken switches, system configuration, and empirically determined characterization settings for both general processor and specific core operations are required in order to operate a given system. The process of performing the chip initialization has historically been completed multiple times, including, for example, during simulation, during lab tooling, and/or during production of the actual system that the chipset resides in. Each of the above steps of the design, development and implementation cycles (i.e., simulation, lab, and production) requires multiple rewrites of the initialization code throughout the chipset life cycle.

Also, the initialization code for a specific chipset must be customized to contain the initialization unique to a specific system in which that chipset is to be utilized. Thus, for each new system and for every slight modification or tweak to the chipset, the initialization firmware must be updated since the firmware contains intimate knowledge of how to move data into the hardware. When a vendor or system manufacturer wants to support a new layout or variation of the chipset, a new code must be written and updated. This requires the vendor or system manufacturer to understand and acquire knowledge of the chipsets registers, layout, replication and interactions.

BRIEF SUMMARY

Disclosed are a method, a system and a computer program product for providing a single hardware procedures framework that handles and/or support processor firmware initialization across multiple environments via a single code set. According to one aspect, all communication and data exchange between processor hardware of a chipset and any system or simulation within which the chipset is operated can be supported via the single framework, regardless of the uniqueness and/or constraints of the underlying system.

Disclosed are a system and a computer program product that provide a single hardware procedures framework that handles and/or support processor firmware initialization across multiple environments via a single code set. According to one aspect, all communication and data exchange between processor hardware of a chipset and any system or simulation within which the chipset is operated can be supported via the single framework, regardless of the uniqueness and/or constraints of the underlying system.

In a first embodiment, the system includes: in response to detecting a power-on operation of the processor, a microcontroller retrieving hardware procedures (HWP) framework code from a storage and triggering execution of the HWP framework code on the processor. The execution of the HWP framework code generates a HWP framework that comprises a plurality of application programming interfaces (APIs) which govern how all communication processes involving hardware procedures can be accomplished. The system further includes the microcontroller performing one or more initialization procedures by communicating one or more attribute data via the HWP framework to configure the processor for operation within a specific platform environment in which the processor is to be operated.

According to one aspect, the specific platform environment is one of a flexible service processor (FSP) of a multi-processor system, a debug system, Host based Inits (HBIs) or HostBoot™, a hypervisor-based virtual environment, and a hardware simulator. Also, the HWP framework provides an abstraction layer between the specific platform environment and the initialization procedures of processors and processor cores during power up of the system. The HWP framework abstracts away a complexity of performing functions including error handling, performance, configuration, and inputs/outputs (I/O) away from the hardware procedures and encompasses the complexity of system and processor chip interactions. Also, the hardware procedures are represented as a common code that runs inside the HWP framework and provides hardware-specific logic for controlling some portion of the system hardware. The hardware procedures code is written once and can be compiled across multiple platform environments. Additionally, the HWP framework includes (a) a standard set of interfaces which the hardware procedures are designed to utilize and (b) a platform and environment specific implementation of the standard interface, which allows the hardware procedure to run in a target environment.

According to one aspect, the specific platform environment is one of a flexible service processor (FSP) of a multi-processor system, a debug system, Host based Inits (HBIs) or HostBoot, a hypervisor-based virtual environment, and a hardware simulator. Also, the HWP framework provides an abstraction layer between the specific platform environment and the initialization procedures of processors and processor cores during power up of the system. The HWP framework abstracts away a complexity of performing functions including error handling, performance, configuration, and inputs/outputs (I/O) away from the hardware procedures and encompasses the complexity of system and processor chip interactions. Also, the hardware procedures are represented as a common code that runs inside the HWP framework and provides hardware-specific logic for controlling some portion of the system hardware. The hardware procedures code is written once and can be compiled across multiple platform environments. Additionally, the HWP framework includes (a) a standard set of interfaces which the hardware procedures are designed to utilize and (b) a platform and environment specific implementation of the standard interface, which allows the hardware procedure to run in a target environment.

One embodiment further includes providing an execution environment for invoking procedures, error handling, coalescing system information, and providing hardware access via the HWP framework. The HWP framework enables direct updates to hardware procedures without requiring a new code flash image or a patch from firmware, but instead uses only data written to flash.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, system and computer program product for providing a single hardware procedures framework that handles and/or support processor firmware initialization across multiple environments via a single code set. According to one aspect, all communication and data exchange between processor hardware of a chipset and any system or simulation within which the chipset is operated can be supported via the single framework, regardless of the uniqueness and/or constraints of the underlying system.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
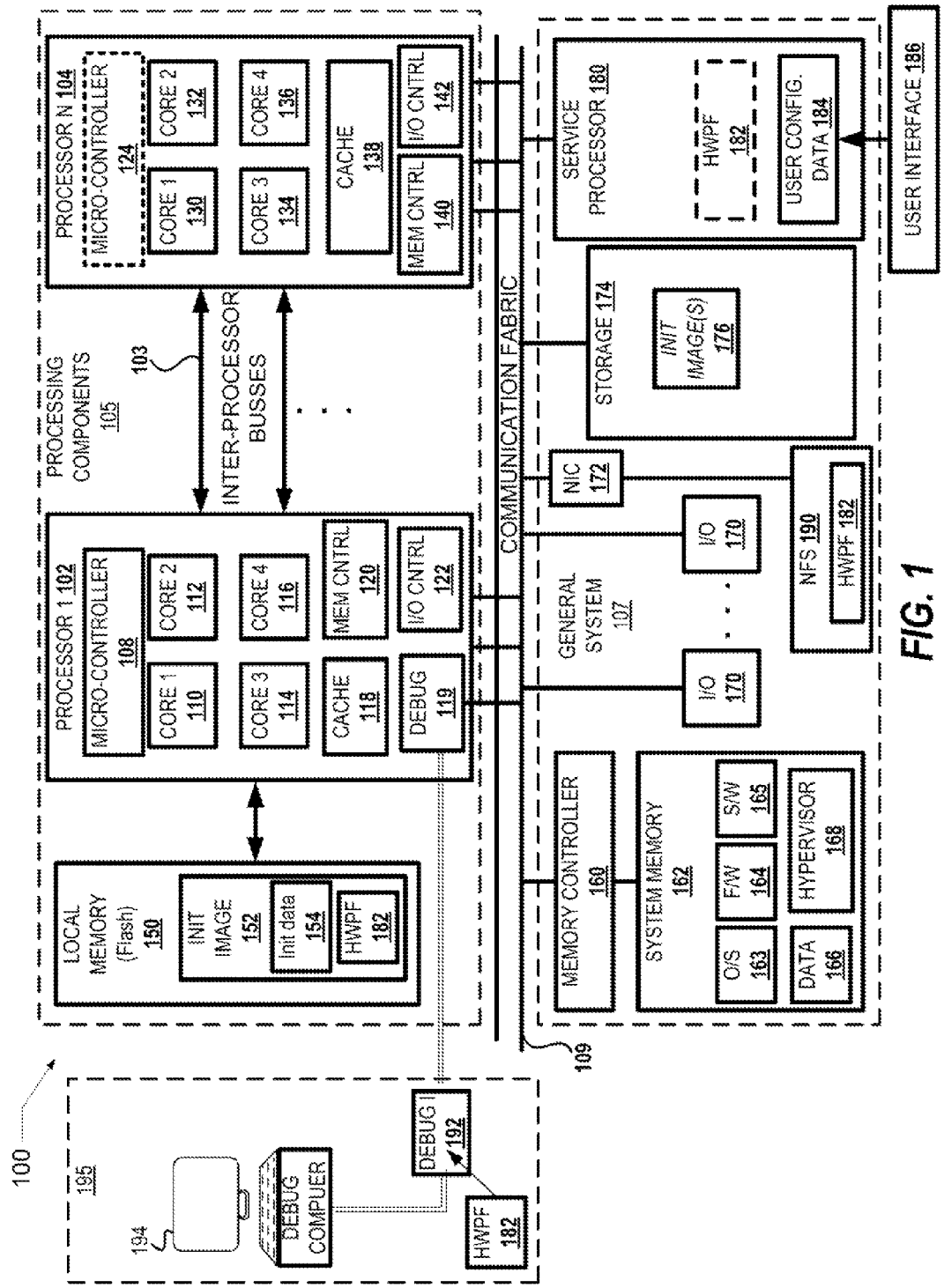
FIG. 1 provides a block diagram representation of an example data processing system within which one or more of the described embodiments can be practiced.

Those of ordinary skill in the art will appreciate that the hardware components and basic configuration depicted in FIG. 1 and the other figures may vary. Thus, illustrative components within DPS 100 (FIG. 1) or any of the various representations of the hardware procedure framework environment are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The example data processing systems depicted in FIG. 1 may be, for example, an IBM eServer pSeries system, a product of International Business Machines Corporation in Armonk, N.Y., running the Advanced Interactive Executive (AIX) operating system (Trademark of IBM Corporation) or LINUX operating system (Trademark of Linus Torvalds).

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

With reference now to the figures, and beginning with FIG. 1, there is depicted a block diagram representation of an example data processing system (DPS), as utilized within one embodiment. The data processing system can be described as having features common to a server computer. However, as used herein, the term "data processing system," is intended to include any type of computing device or machine that is capable of receiving, storing and running a software product and retrieving data/instructions from a storage device. Therefore the DPS can include not only computer systems, but also devices such as communication devices and personal and home consumer devices.

FIG. 1 and the following discussion are intended to provide a brief, general description of an exemplary data processing system adapted to implement the described embodiments. While embodiments will be described in the general context of instructions residing on hardware within a server computer, those skilled in the art will recognize that embodiments may be implemented in a combination of program modules running in an operating system. Generally, program modules include routines, programs, components, and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 and the following discussion are intended to provide a brief, general description of an exemplary data processing system adapted to implement the described embodiments. While embodiments will be described in the general context of instructions residing on hardware within a server computer, those skilled in the art will recognize that embodiments may be implemented in a combination of program modules running in an operating system. Generally, program modules include routines, programs, components, and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example DPS 100 that comprises a multiprocessor system having processing components 105 that are in communication with system environment 107 through a communication fabric 109. Processing components 105 include one or more processors, processing modules or chips 102 and 104. While two processors, P1 and PN, are shown in FIG. 1, processing components 105 can include more processors or fewer processors. That is, the value of N can be greater than 1 (e.g., 2 or larger) or zero (i.e., no second processor). Processor 1 102 includes a microcontroller 108 and several processing units, processor cores or cores, core 1 110, core 2 112, core 3 114 and core 4 116. Similarly, processor N 104 can include a microcontroller 124 and several processing cores, core 1 130, core 2 132, core 3 134 and core 4 136. It is appreciated that in one embodiment, a single controller can be provided within processing components 105, and that controller can be located external to the processors or internal to a single processor configured as a master processor, which performs processor initialization and other tasks assigned specifically to the master processor or the microcontroller. Processor 1 102 and Processor N 104 both also include a cache subsystem 118 and 138. Cache subsystem 118 and 138 can comprise one or more levels of caches, such as an L1 cache and an L2 cache, and one or more of the lower levels of caches can be a shared cache. Processor 1 102 and processor N 104 have internal memory controller 120, 140 and internal I/O controller 122, 142. All of the components of processor 1 102 can communication with each of the other components of processor 1 102. Similarly, all of the components of processor N 102 can communication with each of the other components of processor N 104.

Processor 1 102 and processor N 104 are coupled to system interconnect or communication fabric 109, which couples other components of DPS 100 to processors 102 and 104. Communication fabric 109 in an embodiment can be an address and data bus. Communication fabric 109 includes specific messaging signals communicated over specific signal lines (not illustrated). Processor 1 102 represents the master processor within the plurality of processors. As the master processor, processor 1 102 can be in communication with a local memory or storage device 150. In one embodiment, local memory 150 can be a flash memory, such as a NOR flash. Local memory 150 stores an initialization image 152 for initializing processor 102 during a start up sequence. Additionally, according to one aspect of the disclosure, local memory 150 also includes HWP framework code 182 for execution on master processor, processor 1 102, during system start-up or processor chipset initialization. In at least one embodiment, as shown, HWP framework code 182 is provided within initialization image 152. Initialization image 152 thus includes both HWP framework code 182 and init data 154. It is important to note that the HWP framework code 182 does not change from system to system; however, the init data 154 within initialization image 152 does change based on the specific system in which the initialization image 152 is being utilized. Processors 102 and 104 can communicate with each other through one or more inter-processor busses 103. Inter-processor busses 103 allow the exchange and sharing of data and information between processor 1 102 and processor N 104.

System environment 107 provides system devices or components, firmware, and software that collectively make up the environment in which the processing devices 105 operate. System environment 107 includes a system memory 162 coupled to communication fabric 109 via a memory controller 160. System memory 162 can include therein a plurality of modules and routines, including operating system (O/S) 163, firmware (F/W) 164, software (S/W) 165, data 166, and hypervisor 168 (where DPS 100 supports virtualization). The various software and/or firmware modules have varying functionality when their corresponding program code is executed by one or both of processors 102 and 104 within DPS 100. DPS 100 can also include input/output devices and corresponding controllers, generally represented as I/O 170, and a network interface card (NIC) 172, among other components. NIC 172 enables DPS 100 to connect to and communicate with other remote devices and networks, including where appropriate, a network file system (NFS) 190.

System environment 107 can further include physical computer readable storage media 174 (or storage) such as hard disk drives coupled to communication fabric 109. Storage media 174 can also include solid state storage devices, optical drives and other storage devices. In one implementation, computer readable storage media 174 can store one or more initialization images 176 for initializing processors 102 and 104. A service processor 180 is coupled to communication fabric 109. Service processor 180 is responsible for various aspects of the operation of DPS 100. Service processor 180 includes user configuration data 184 and boot code 185. User configuration data 184 allows a user to establish various parameters and settings for the operation of DPS 100. A user can provide input of user configuration data 184 via a user interface 186. Within service processor 180 can be a copy of HWP framework code 182, where the execution of the initialization code does not occur from the local memory 150 of the master processor (102). However, HWP framework code 182 can alternatively be held within a NFS 190, such as is represented as connected to NIC 172.

According to one or more embodiments, aspects of the disclosure relate to providing the HWP framework within a debug environment. FIG. 1 further illustrates an example debug environment relative to the existing DPS 100. Debug environment 195 includes a debug interface 192 communicatively coupled to each processor 102, 104 of DPS 100. Debug interface 192 can be any type of known debugger component and can provide an interface to certain bits and/or registers within processors 102, 104 to enable the tracing or tracking of debug conditions that can occur within processors 102, 104. Debug environment 195 also includes a debug computer 194 or other processing device on which debug code (not shown) can be run to generate an output that can be presented to a user of debug computer 194, for example. Notably, as shown by the arrow, debug interface 192 can include an instance of HWP framework 182. It is appreciated that HWP framework 182 may actually operate within debug computer 194.

Figure 2:
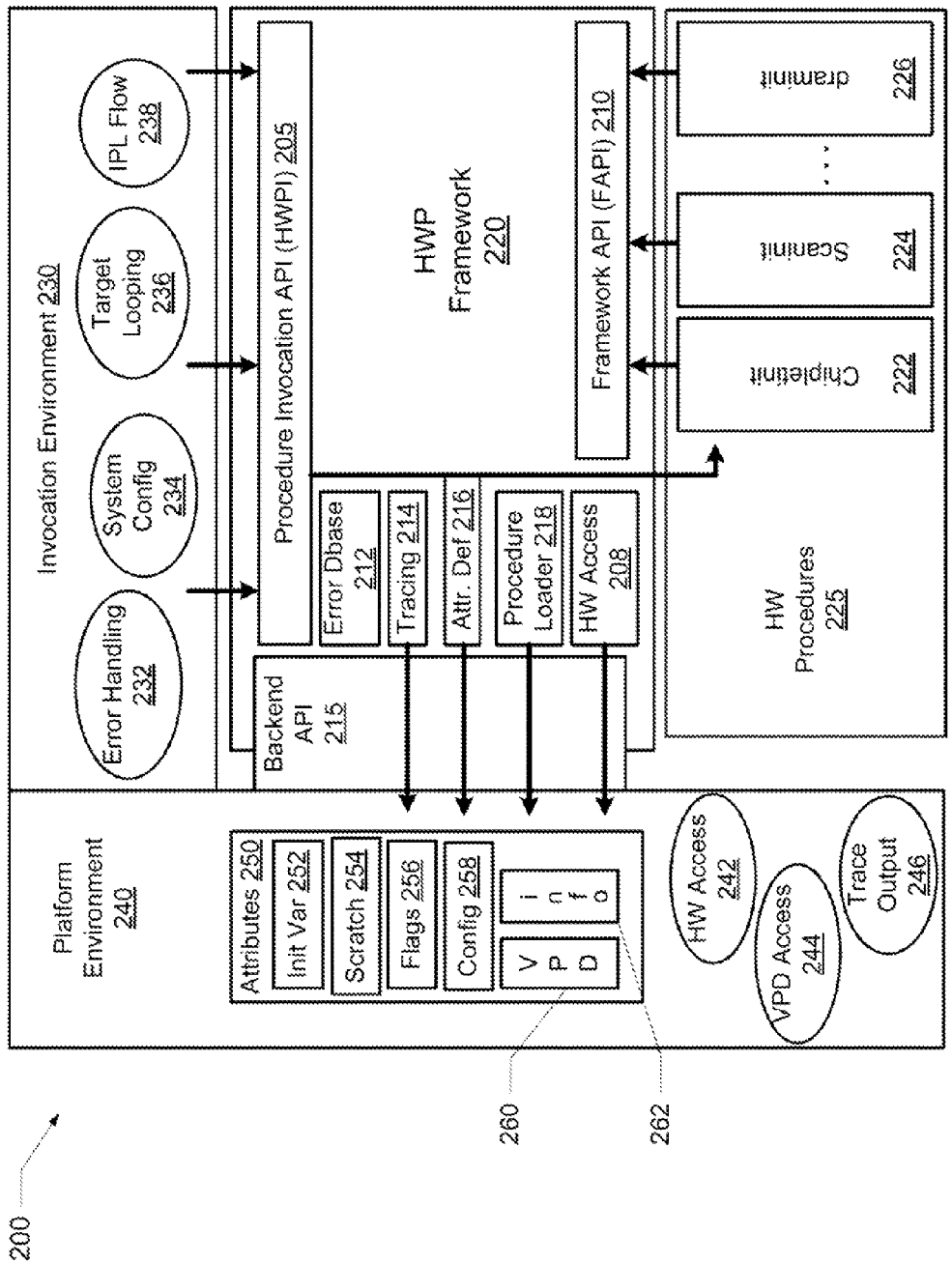
FIG. 2 illustrates a block diagram of an system initiation environment implementing a hardware procedures framework, in accordance with one or more embodiments.

Referring now to FIG. 2, there is illustrated a high level block diagram illustrating an example chipset initialization environment 200 for a data processing system configured with a hardware procedure (HWP) framework 220 interconnected to and in communication with other physical and logical components. The functional and I/O data connectivity between the HWP framework 220 and other components are indicated by directional arrows. HWP framework 220 can be thought of as an abstraction/simplification layer between the environment (i.e., the entire physical system or the simulated representation of a physical system or a virtual system) and the initialization procedures (i.e., the chipset initialization of processors and processor cores during power up of the system. HWP framework 220 is generated by execution of HWP framework code 182 (FIG. 1) on a master processor, e.g., processor 1 102, of the general data processing system. Generally, as further illustrated by FIG. 3, which is described hereafter, the framework represents a set of code providing an environment in which the hardware procedure runs. The framework includes (a) a standard set of interfaces which the hardware procedures are designed and/or coded to utilize and (b) a platform-specific or environment-specific implementation of the standard interface which allows the common hardware procedure to run in the target environment. The hardware procedure is then a common code that runs inside the framework and provides hardware-specific logic for controlling some portion of the system hardware. Within chipset initialization environment 200, hardware procedures framework 220 is written once and compiled everywhere, and stored as executable program code within a storage facility of the data processing system. In one embodiment, the code that comprises or implements hardware procedures framework 220 can be stored in system memory as executable firmware used during device initialization. In another embodiment, the code can be stored within flash memory associated with one or more of the processors, such as local memory (NOR flash) 150.

Hardware procedures framework 220 includes procedure invocation API 205, framework API (FAPI) 210, and backend API 215. Hardware procedures framework 182 is functionally associated with and/or receives inputs from hardware procedures 225, which are deliveries from the hardware or lab development team. The hardware procedures 225 which can also be referred to as hardware initialization procedures 225 are a common code that runs inside the framework and which provides the hardware-specific logic for controlling some portion of the system hardware. According to one embodiment, the hardware initialization procedures 225 are written "once" and compiled for each environment (e.g., simulation, lab, and production).

The Hardware Procedure (HWP) 225 is a module of code that performs some defined action on server hardware. Typically, a HWP 225 initializes a component of hardware. The HWP Framework 220 allows the HWP 225 to be run on many different platforms including: an FSP (Service Processor); HostBoot™ (i.e., Server Host Processor); an external computer attached via debug headers for hardware bring-up/debug; and against a simulation environment, such as a VHDL cycle accurate simulation environment, in which the inits (attribute inputs) can be directly sent/fed into simulation latches. Each platform may have different architectural requirements for its code which translates to the HWP code, including, but not limited to: (1) how the Target of a HWP is represented; (2) the convention for function return codes; (3) how errors are reported; and (4) how system attributes are obtained. According to one embodiment, the Hardware Procedure Framework (HWPF) 220 provides a framework against which platform independent HWP code can be written. The HWP code can be provided from a plurality of sources, including: HWPF Platform Code (PLAT), which is written for each platform (e.g., simulation, bring-up platform, HostBoot™, FSP) and which provides platform specific support for specific FAPI functions; HWPF Code (FAPI), which is written once and provides platform independent framework for executing HWP code; and Hardware Procedure Code (HWP), which is also written once, and which provides business logic for performing a hardware procedure and calls FAPI functions.

Figure 8:
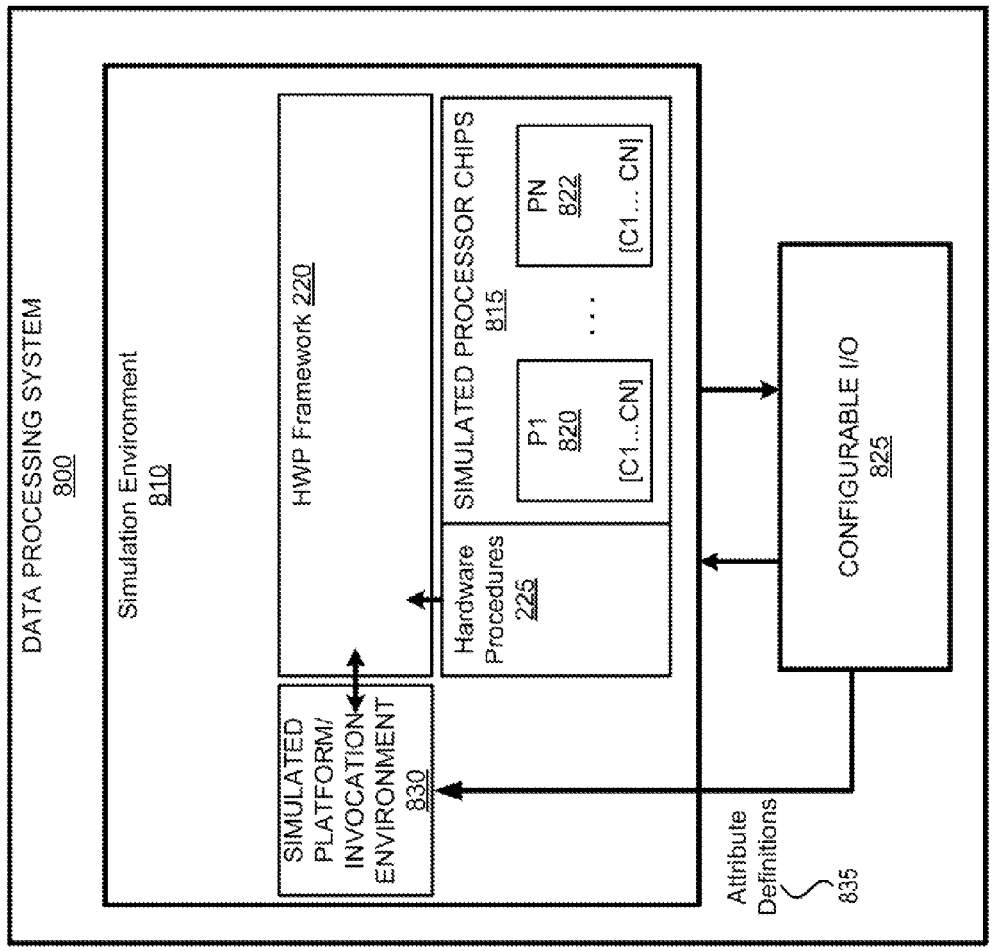
FIG. 8 is a block diagram illustrating an example computer-generated simulation environment within which the HWP framework can be utilized, according to one embodiment of the disclosure.

FIG. 1 illustrates several of the components found within most of the aforementioned platform environments, with the exception of the simulation environment. FIG. 8 illustrates an example simulation environment in which the HWP framework is implemented. A simulation environment 810 is shown within data processing system (DPS) 800, which can be any type of processing device on which the specific code for performing high level simulations can be executed. Thus, DPS 800 includes all required hardware components, including one or more processors, storage, and/or memory. DPS 800 also comprises I/O devices, which are generally represented as configurable I/O 825. Simulation environment 810 includes a set of simulated processor chips 815 of which processors, P1 820 and PN 822 are shown. Each processor 820 and 822 can include one or more cores, as indicated by the presence of C1 . . . CN within the respective processors. Associated with these simulated processor chips 815, are a set of hardware procedures 225 that are defined for HWP framework 220, both provided via execution of relevant HWP framework code on the local physical processor(s) of DPS 800. A simulated platform and/or invocation environment 830 can also be provided via input of specific attribute definitions 835 using configurable I/O 825 or other mechanism. Within this simulation environment 810, HWP framework 220 and hardware procedures 225 are shown to be the same functional components as presented in FIG. 2, by use of the respective reference numerals.

Returning to FIG. 2, illustrated within hardware initialization procedures 225 are three inputs of a plurality of data inputs utilized to initialize the chipset. These data inputs include Chipletinit 222, Scan init 224, and draminit 226. Those skilled in the art are familiar with these inputs and what functionality is respectively represented by these inputs as well as other inputs that can be applied within hardware initialization procedures 225.

Invocation environment 230 and platform environment 240 are also coupled to hardware procedure framework 220. In most implementations, these two environments are custom to each system topology or system environment. Thus, invocation environment 230 and platform environment 240 may present multiple different implementations during simulation, lab, and/or production processes. It is appreciated that while illustrated as separate components, invocation environment 230 and platform environment 240 can be a same component providing both sets of functionality as the individual components. However, alternate embodiments, as that presented in FIG. 2 allow for the two components to be completely different implementations.

The invocation environment 230 is a platform-specific or environment-specific path in which the hardware procedures can be executed. In one or more embodiments, the invocation environment 230 can be a Linux™ stand-alone command line, a daemon process executing a function call, a client process executing a remote procedure call, or any other way that a hardware procedure may need to be invoked.

Bridging the various communicatively connected components are formalized APIs to enforce abstraction. As shown, Framework API 210 provides an API to the hardware procedures 225. Framework API 210 represents a constrained set of APIs that are the only things initialization procedures can call. In the described embodiment, the constrained set of APIs (225) are limited to input/output data, referred to herein as attributes, target information (i.e., an identification of which chip the attributes (I/O data) is operating on), and a standard chip hardware access layer. Thus, all information on how to initialize the chip must come into the framework 220 via these attributes. According to one embodiment, the data can be a direct value to place into the hardware. With this embodiment, the initialization procedure formats the human understandable data into the hardware format. According to a next embodiment, the data can be control or state information. With these attributes provided as data inputs to hardware procedures framework 220 via framework API 210, the procedures can execute hardware operations, query attributes about the general system, and generally perform the function for which they are designed. According to one aspect, the framework API 210 includes base classes, utilities and glue code, which are reusable across all platforms. Thus the framework API 210 is supported in the service processor firmware, within the design code for the server design machine, and by HostBoot™ firmware of the processors.

Hardware procedure invocation API 205 represents a next set of input APIs to the hardware procedures framework 220 from invocation environment 230. Hardware procedure invocation API 205 is an abstraction layer between the environment and the framework. However, unlike the framework API 210, hardware procedure invocation API 205 is an abstraction layer to the invoker of the hardware procedures 225. The HWPI 205 is the API which the HWP framework 220 exposes to applications and which controls the flow and execution of the procedures. As shown, hardware procedure invocation API 205 supports the error handling 232, system configuration 234, target looping 236, and IPL flow 238. Within the HWP framework 220, the procedures are written a single time, and the entry points are defined by the HWP framework 220. The HWP framework 220 can then operate within any environment that adheres to the APIs provided by the HWP framework 220.

The backend API 215 defines how each platform chooses to implement the required Framework API 210 that are utilized by the hardware initialization procedures 225. This use of a backend API 215 allows for a wide flexibility in platforms. For example, in simulation all attributes can be hard coded constants, whereas in the lab, methods can be provided to override and tweak the inputs for testing versus production. During production, the inputs are coded up as XML lookups. According to its functional usage, the backend API 215 is not technically an API. Backend API 215 supports communication of data to the platform, including hardware access 208, error database 212, tracing 214, attribute definitions 216, and procedure loader 218. These attributes pass through backend API 215 and interact with or trigger functions within platform environment 240.

Hardware access 208 is utilized to manipulate hardware or to access a specific bus on the platform environment 240. HWP framework 220 operates on different platform environments, such as environments that can include a service processor, host processor, lab tools, and hypervisor. Each platform environment may have different means of accessing the hardware. For example the service processor can utilize an FSI bus to perform access. The lab debug tools can utilize a connection over a debug header into the chip. Host firmware can utilize inband mechanisms such as Memory Mapped I/O (MMIO) Reads/Writes. Finally, simulation directly toggles VHDL latches.

The platform environment 240 provides a platform-specific or environment-specific functions and services that may need to be invoked as a result of running the HW procedure 225. These functions can include communication support, error handling, debug tracing, and others. Provided within platform environment 240 are various functions including hardware access 242, VPD access 244, and trace output 246. Within platform environment 240 is attributes tank 250 in which the set of defined attributes are provided. Among the attributes presented within example attributes tank 250 are initialization variables 252, scratch 254, flags 256, and configuration data 258, Vital Product Data (VPD) 260, and general information 262. Attributes tank 250 can include attributes from HostBoot™, machine filesystem, or chip design machine, and can include user defined attributes.

According to one aspect of the described embodiments, the various attributes within attributes tank 250 represent attributes of a target or of the system that a HWP 225 gets using the FAPI_ATTR_GET macro and sets using the FAPI_ATTR_SET macro. According to one embodiment, the build of attributes tank 250 includes a synchronization process to ensure that all similar contributions to attributes tank 250 have similar definitions and can receive the same data types. According to one embodiment, the attributes tank 250 can be maintained within a filesystem in the NFS mount of the system's service processor.

Figure 3:
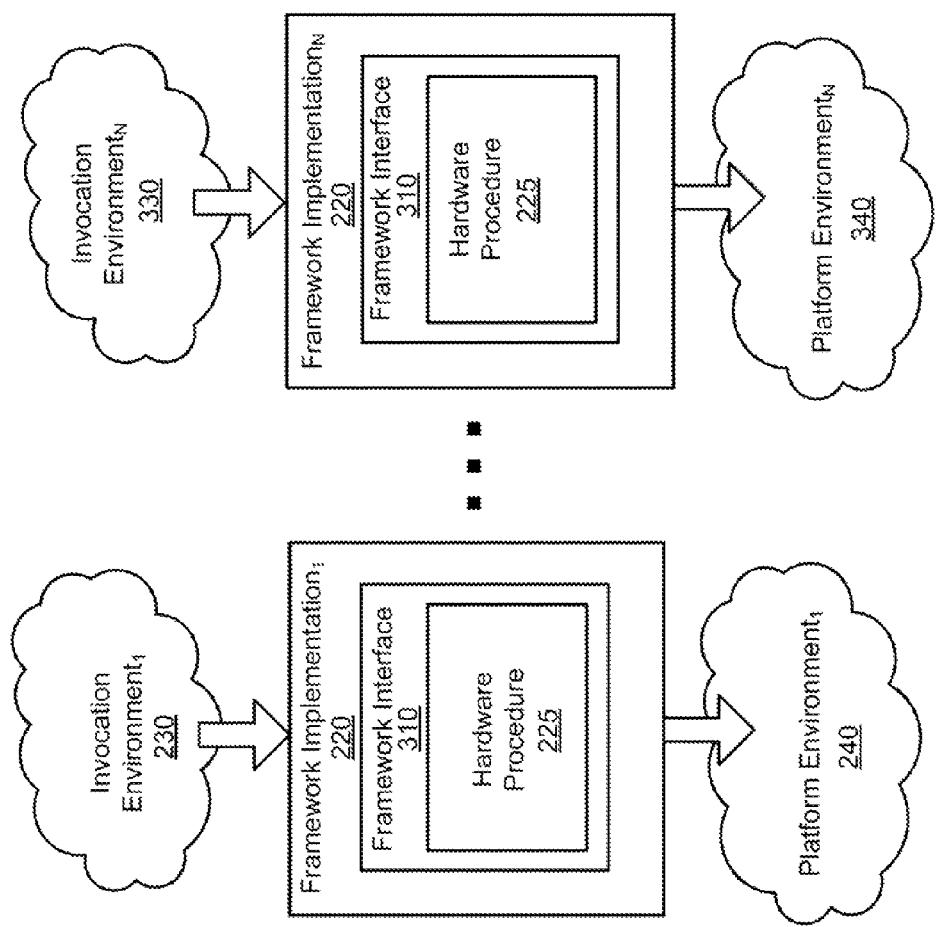
FIG. 3 illustrates a more general overview of the utilization of a HWP framework without multiple different environments and across multiple different platforms, in accordance with one or more embodiments.

FIG. 3 illustrates a generalized view of how the HWP framework can be defined to operate in multiple different environments and on different platforms. As previously introduced, multiple different types of platforms can be supported via the single framework within a variety of different environments. Thus, FIG. 3 shows a first invocation environment 230 interfacing with a first implementation of HWP framework 220. First HWP framework 220 further interfaces with first platform environment 240. First HWP framework 220 is configured with a framework interface 310 which enables communication and information exchange via hardware procedure 225. Also further shown by FIG. 3, an $N^{th}$ invocation environment 330 interfaces with an $N^{th}$ implementation of HWP framework 220. In this scenario, N represents any integer number greater than 1. The $N^{th}$ HWP framework 220 further interfaces with $N^{th}$ platform environment 340. The first implementation and the Nth implementation of HWP framework 220 are the same, and as such, $N^{th}$ HWP framework 220 also comprises framework interface 310 which enables communication and information exchange via hardware procedure 225. With the example presented by FIG. 3 and throughout the disclosure, HWP framework 220 represents an environment in which a hardware procedure can run. The HWP framework 220 includes a standard set of interfaces and supports platform specific implementation of these interfaces. Also, the hardware procedure 225 represents business logic that is provided to perform specific hardware tasks. The invocation environment 230/330 represents the location where the framework resides, and the platform environment 240/340 represents where the framework operates. Examples of the platform environment include FSI and Inband, which require completely different underlying hardware access functions, but are supported by use of the same HWP framework 220. Notably, regardless of the number of different platforms and/or different invocation environments, the underlying functionality of the framework implementations remains the same. Thus, a robust hardware procedure framework 220 is provided as a solution that spans a wide variety of different platforms and general systems environments.

The underlying core functionality of the HWP framework is to provide a common block of code to be utilized in multiple environments. With the hardware procedure framework, all inputs and outputs are abstracted, and the initialization procedure focuses exclusively on the initialization task. These underlying characteristics allow the hardware bring-up tooling (i.e., the lab procedures) to be directly used in product code without modification. Further, these characteristics of the framework also allow updates found in the lab environment to be immediately picked up by production code, with minimal overhead.

According to one aspect of the disclosure, all inputs and outputs to the hardware procedures are abstracted. In one embodiment, the inputs to the framework are introduced as a specific set of attributes comprising a keyed lookup of name and data. In another embodiment, the inputs to the framework are introduced as an enumeration value that is indexed within an array. The outputs of the framework are generic hardware operations and/or writes to attributes, which similarly to the inputs, utilize the same pre-established keyed lookup of attribute name and corresponding data. The framework is implemented as an application programming interface (API), which exists as firmware within a non-volatile storage, such as service processor firmware. According to one or more alternate embodiments, the framework API can exist within or be supported by a chipset bring-up platform or HostBoot™ code. As one facet of the disclosure, each platform that implements the hardware procedures framework must adhere to the API of the framework. However, the framework API allows for the underlying implementation to be drastically different across processor platforms. For example, the processor platforms/system in which the framework is utilized has the responsibility of handling any threading, mutexes, resource constraints, and other aspects unique to that platform.

One aspect of the disclosure involves the framework taking the hardware BU procedures and allowing the end customer (e.g., the system integrator) to tweak the system settings by updating data attributes without requiring any knowledge of the bit level details of how the settings/attributes apply to the hardware. Thus, according to the described embodiments, one aspect of the disclosure is that the framework allows the initialization process to be data driven. Thus, the code to initialize a chipset is written once and then the vendor or the system manufacturer is able to specify the data attributes they want for the overall system in which the chipset is installed.

One motivation for the current innovation is the recognition that the back-end environments in which the chipset is provided or tested are regularly changed through the product development cycle. Logic designers could use a logic simulator (software) initially to develop their initialization procedures, followed by chip integration testers using the hardware simulators (e.g., AWAN). These development steps would then be followed by firmware with full system software simulator, and then followed by hardware bring-up, with both side-band tooling, e.g., Cronus, and fully functional firmware.

With the current implementation of a hardware procedure framework, once the initialization procedure is written, all of the initialization is abstracted and can become completely data driven. In at least one embodiment, the underlying chip registers, required data manipulation, and bit splicing is abstracted from the user. According to one aspect, the scope and complexity of the system and chip interactions are deliberately placed in the framework and outside of the initialization procedures. Thus, instead of the vendor or original equipment manufacturer (OEM) having to update and write firmware for a new chipset layout, the vendor or OEM simply updates the input data to the framework. The framework is focused on abstracting complexity away from the hardware procedures, which abstraction allows the initialization procedures to become extremely straight forward and simple.

Also, according to one embodiment, the various constraints, such as error handling, can be added as the usage of the initialization procedure progresses based on the environment. Since the environment controls all the input and outputs of the procedure, the environment can also control the sequencing, multi-threaded parallelism, error handling, and other functions. This control of the inputs and outputs also allows updates found in the lab to immediately be picked up by production code, with minimal overhead.

According to one embodiment, the hardware procedure framework enables a data driven chip initialization by placing all data needed to perform an initialization procedure into an attribute tank. The job of getting the data into the attribute tank is then performed by one or more other components, and the initialization procedure simply utilizes the data. According to one or more embodiments, a similar philosophy of utilizing attributes within an attribute tank is applied for the functions of tracing, target looping, IPL flow, error handling, and hardware access. Thus, if a vendor wishes to update or tweak a value associated with the system or the particular function, the vendor updates the input data, without having to modify source code or provide a new custom module to initialize the chipset.

Figure 4A:
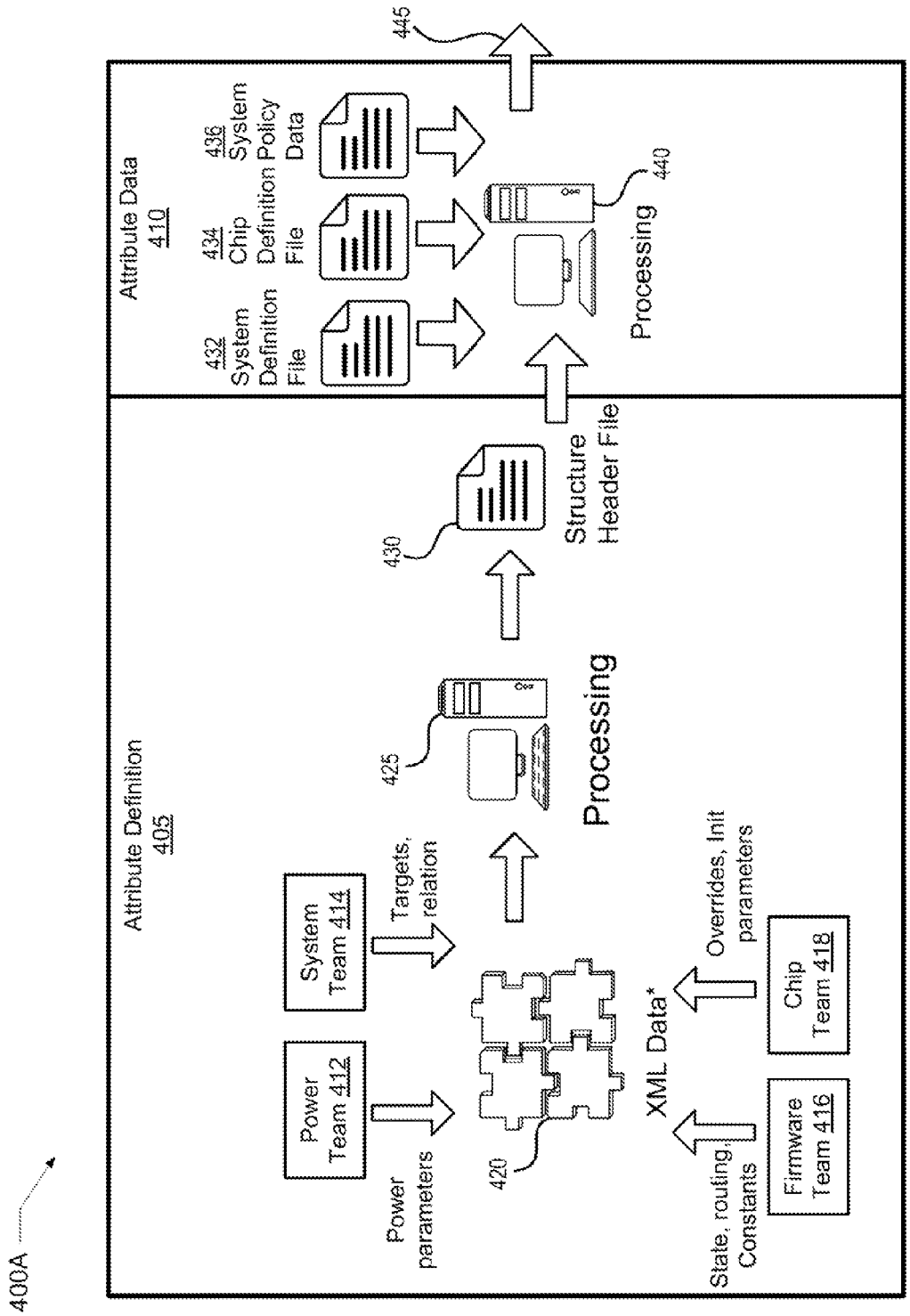
FIGS. 4A-4B respectively illustrate a generic example and a more specific or concrete example of types of attributes that are defined during the design, testing, and development phases of a chipset to generate the attributes definition and corresponding attributes data utilized to communicate with a HWP framework, according to one or more embodiments.
Figure 4B:
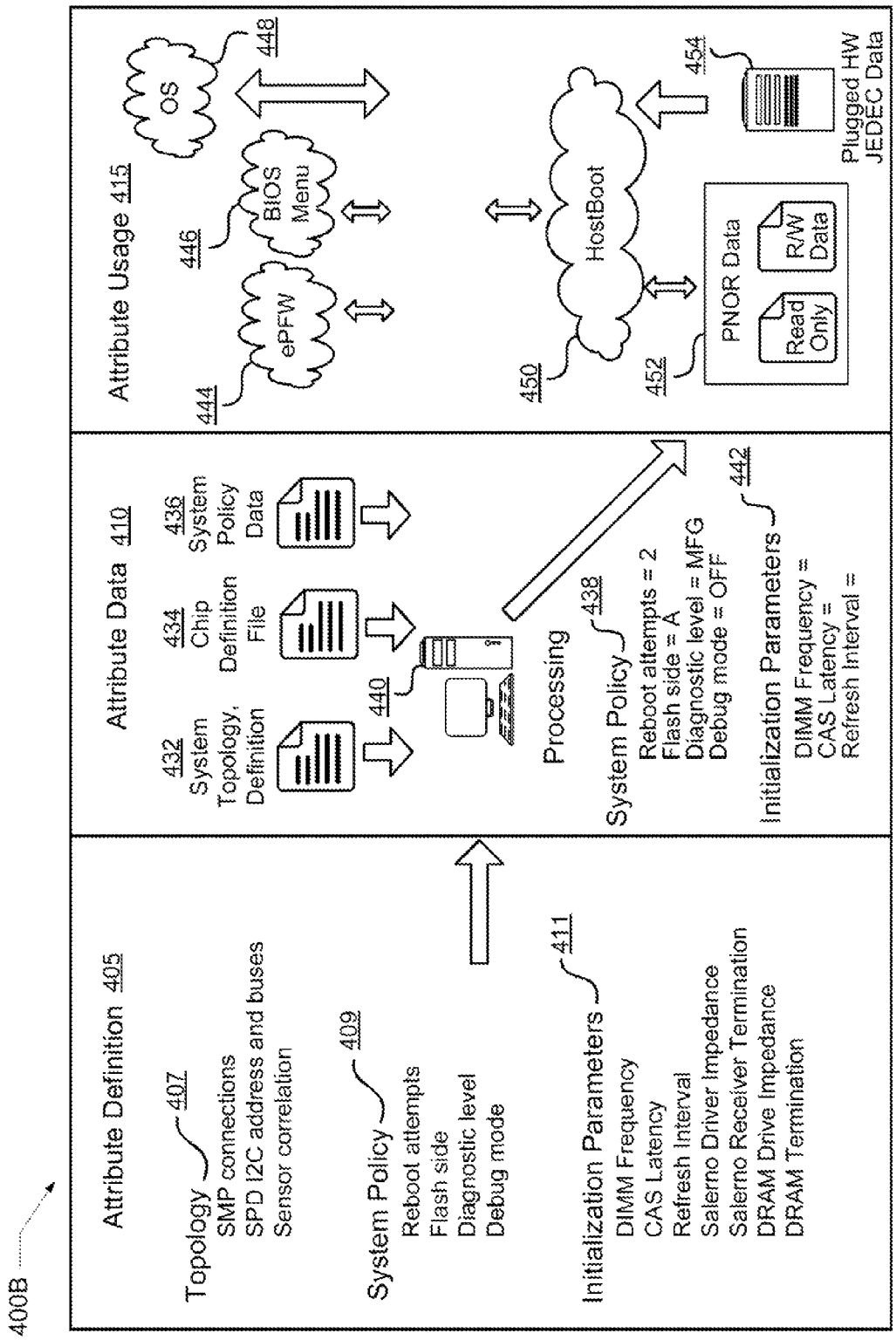

FIGS. 4A-4B respectively illustrate a generic example and a more specific or concrete example of types of attributes that are defined during the design, testing, and development phases of a chipset to generate the attributes definition and corresponding attributes data utilized to communicate with a HWP framework. FIGS. 4A and 4B are described as two design sequences of how the attributes and corresponding data are defined and applied. Design sequence 400A includes attribute definition component 405 and attribute data component 410. Attribute definition component 405 illustrates a collaborative process by which XML data 420 is generated and compiled from a plurality of input sources. These inputs originate from respective teams that are involved in some aspect of the design and testing of underlying chipsets. As presented, the teams include power team 412, system team 414, firmware team 416, and chip team 418. Power team 412 provides power parameters as one set of input data represented within XML data 420. Additionally, system team 414 provides a set of targets and relation to those targets, firmware team 416 provides a set of state data, routing information and constants, while chip team 418 provides data related to overrides and initialization parameters. With these sets of data provided, XML data 420 undergoes a series of processing steps within a data processor 425 to generate a structure header file 430. Structure header file 430 provides a set of attributes and their respective definitions, as applicable to a general platform environment in which a processor chipset can be initialized. The structure header file 430 is then forwarded to the processing component of attribute data 410. Attribute data 410 represents the set of different types of data that can be provided as the value for each attribute defined for a system (as provided within structure header file 430). As shown, attribute data 410 includes system definition file 432, chip definition file 434, and system policy data 436. These different sets of attribute data 410 are integrated along with structure header file 430 within processing system 440 (which can be the same system as 425) to generate an output 445.

FIG. 4B illustrates a second (more concrete) example of the generation and defining of system attributes with associated attribute data. FIG. 4B also illustrates an example system by which the attributes can be utilized. Attribute generation and usage system 400B includes three sections, attribute definition 405, attribute data 410, and attribute usage 415. Components of attribute definition 405 include topology 407, system policy 409, and initialization parameters 411. Some specific examples of the types of information covered by each component are indicated within attribute definition 405. Thus, for example topology 407 covers and/or includes information about SMP connections, SPD I2C address and buses. As another example, initialization parameters 411 can include DIMM frequency, CAS latency, refresh interval and DRAM drive impedance. These attribute definitions are provided to processing system 440 which provides attribute data 410. The attribute data can include system topology definition 432, chip definition file 434, and system policy data 436. Examples of the resulting output from processing are shown as system policy 438 and initialization parameters 442. As an example, the system policy attribute for reboot attempts is provided attribute data value of 2, while diagnostic level attribute is provided attribute value of MFG indicating that the manufacture defined diagnostic level should be utilized.

Attribute usage 415 then shows how these attributes with their assigned attribute data values can be utilized within the data processing system or platform in which the framework is being utilized. Attribute usage component 415 includes firmware (ePFW) 444, BIOS 446, and OS 448, each communicating to HostBoot™ 450. HostBoot™ 450 is then communicatively connected to PNOR data 452 and receives plugged HW JEDEC data 454. The illustration of attribute usage 415 represents that the attribute data 410 (e.g., system configuration, layout, etc.) is used by HostBoot™ to perform initialization of the system, and then that same attribute data 410 flows up to the boot FW (ePFW), to the BIOS menu, and to the OS. As the data 410 flows to the different components, the data does change form, but the information all originates from the HWP framework's attribute data. According to one embodiment, in addition to the data flowing up, end users can also push information down into the attribute tank, as all attributes can be defined to be end user modifiable.

Figure 5:
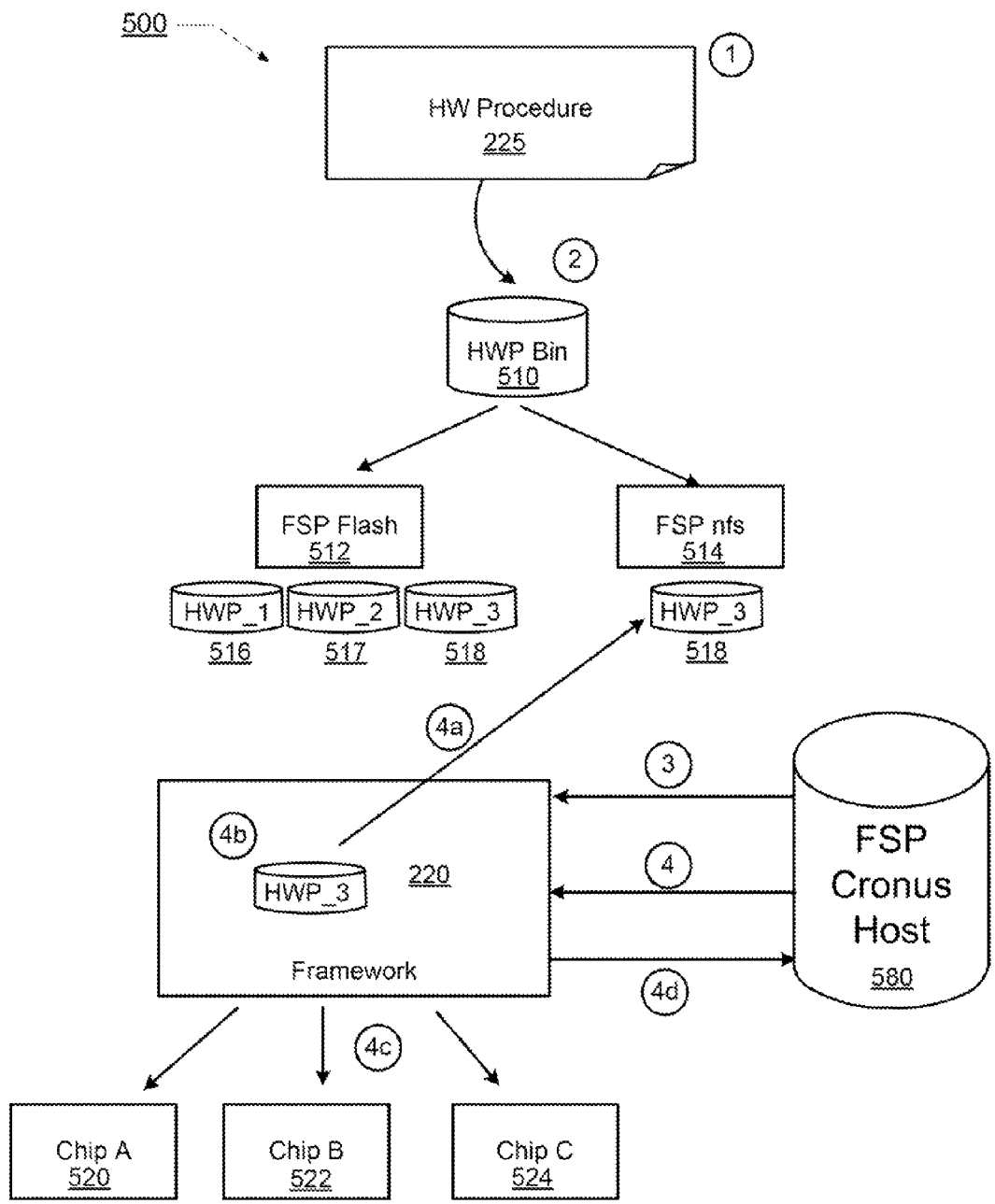
FIG. 5 is an implementation diagram showing specific steps in the compilation and execution of the HWP framework, according to one or more embodiments.

FIG. 5 illustrates an example of an implementation sequence 500 for generating and using a hardware procedure framework 220. Specifically, FIG. 5 illustrates an example framework context diagram. On the figure, circled numbers are provided to generally indicate the sequence in which the implementation occurs. A set of hardware procedures 225 are generated as program code by a hardware team at timeframe 1. At timeframe 2, the hardware procedures (HWP) code (225) is compiled into HWP binary 510 for the desired architecture/system on which the code is to be run or executed. Thus, for example, a HWP binary 510 can be generated for use by a specific environment (FSP, Host Boot, Simulation, and/or debug machine). The specific embodiment illustrated shows the generation of the HWP binary 510 for the service processor and/or HostBoot™. The HWP binary 510 is stored in processor flash 512 as different HWP binary files 516-518, for each respective architecture or system that generated the HWP binary 510. Additionally, in one or more embodiments, HWP binary file 518 generated for a host system can also be stored within other server accessible storage 514, such as a network file system. It is appreciated that processor flash 512 can be the NOR flash 150 (FIG. 1) associated with one or more processors. Notably, a single HWP code 505 is utilized to generate the required HWP binary 510 that is utilized at each stage of the design and implementation processes for the associated server hardware.

At timeframe 3, the HWP procedure framework is initialized. Specifically, with the HWP binary files available and/or accessible from flash 512 or other storage 514, the specific system or architecture accesses the specific HWP binary file 516-518 within the flash 512 (timeframe 3). When initialized within a host system, one embodiment includes the host processor or firmware retrieving the respective HWP binary file 518 from other storage 514 (timeframe 4a). Within the host system implementation, the retrieved HWP binary file 518 is executed within the master processor during system power-on. The master processor executes the HWP binary 516-518 to initialize HWP framework 220 (timeframe 4b). The HWP framework 220 executes on the detected hardware (timeframe 4c), which includes chip A 520, chip B 522 and chip C 524, as examples. As one aspect of the execution of HWP framework 220, HWP framework facilitates the return of hardware status information as well as any detected error (timeframe 4d). Importantly, HWP framework 220 is initialized before any hardware procedure is called. During operation of the chip or on power up of the respective hardware, HWP binary 510 as well as the other initialization data is retrieved from the flash 512 or other storage 514.

According to one or more embodiments, the framework is designed to adhere to certain specific requirements and/or provide certain execution characteristics. A summary of these requirements are provided below; however, it is appreciated that not all requirements are required for every implementation of a framework covering the functionality described herein. It is further understood that additional requirements can be provided in alternate implementations of framework. Among the characteristics of the framework are: (1) the hardware procedures must be designed and written only once, and should be simple to recompile and relink to build the usable and shippable code for all other platforms & environments; (2) the framework should detect and uniquely identify hardware errors, and in one embodiment, FAPI calls that return errors are bubbled up to the invocation environment; (3) the framework can dynamically load procedure updates without rebuilding FSP flash image and can also compile procedure updates in lab environment; (4) the framework and/or the framework API should run in a variety of platforms and/or environments; (5) the framework should have command line invocation environment for all procedures (both IPL and non IPL); and (6) with the framework, any procedures written against the Framework API can call other procedures written against the FAPI, without any cyclic dependencies.

In one or more embodiments, additional requirements and characteristics can also be provided for the hardware procedures. A short, non-exclusive list of such requirements and characteristics include: (1) the hardware procedures should not directly invoke any system functions or services outside of certain pre-established standard functions, such that any needed services can only be invoked via standard Framework Interface functions; (2) the hardware procedures should not make any assumptions about the sequence of operations and control flow outside of the HW procedure's own logic, except where explicitly documented in the Framework Interface, and should be thread safe (i.e., does not utilize global or static variables); (3) the hardware procedures should detect and uniquely identify hardware errors, including problems with the hardware being operated upon; and (4) the hardware procedures should attempt to complete the entire procedure on all available HW prior to return to invocation environment (e.g., find all the bad parts, then return). It is appreciated that not all requirements and/or characteristics have to be implemented in each implementation of the hardware procedures, and certain of the above listed characteristics can be replaced with others or excluded altogether for a particular implementation.

According to one embodiment, the framework APIs can include, but are not limited to and not necessarily inclusive of the following APIs:

fapiGetChildExistTargets(target, type, downlist)
fapiGetChildFunctionalTargets(target, type, downlist)
fapiGetTargetInfo(target, <ec, chipid, children targets>)
fapiGetRing(target, ringModifier, databuf)
fapiPutRing
fapigetscom, fapiputscom, fapiputscomUnderMask
fapigetcfam/fapiputcfam
fapigetspy/fapiputspy
fapigetspyEnum/fapiputSpyEnum
FAPI_GET_ATTR
FAPI_SET_ATTR In one or more embodiments, the HWPI provides a mechanism to have different "levels" of implementation which support differing sets of function. Further the HWPI provides interfaces for the Invocation environment to do all of the following: query and set the attributes; query Error Database per target/error combination; initialize the framework; pass in the location of the hardware procedures; pass in the location of attributes; and support targeting of individual chips and groups.

In one or more embodiments, the FAPI provides interfaces to: (1) communicate to CEC hardware, with the ability to translate addresses to specific target (e.g. core 0 address on core 3 target); perform debug tracing, with ability to prepend or postend unique target information; library APIs; query framework attributes (vpd, config, and others); call other hardware procedures; switch seamlessly between FSI and inband access on HBI implementation, controlled by framework attribute value; provide API to convert opaque target structure into "target string" format; and provide API to generate informational log with data capture.

According to one embodiment, the framework and framework attributes provide the following characteristics: provide attributes that can be queried and set by procedures and initfiles; can abstract all data to HW procedures, since the framework attributes are the procedures only communication mechanism to the environment; persist entire length of IPL/Runtime; associate all Read/Write variables with a particular target; not provide any writable "global" attributes from procedures; directly map all framework arguments into framework attributes; provide system configuration and topology, such as topology, system state (e.g., warm, cold, memory preserving), chip state (e.g., present, functional, powered off); uniquely address all chips and sub targets; control caching, locking, and persistence of attributes; provide scratch attributes for lab debug usage; provide command line mechanism to update attributes, including the ability to update between isteps, dump (view) all attributes, and classify or group attributes by type (e.g. proc, memory, EDI); and classify attributes by type. According to one embodiment, attributes must be well defined so both hardware procedures and the API understand (e.g., definition file or header file). In one implementation, the attributes must be tagged with a descriptive comment and clear usage.

Figure 6:
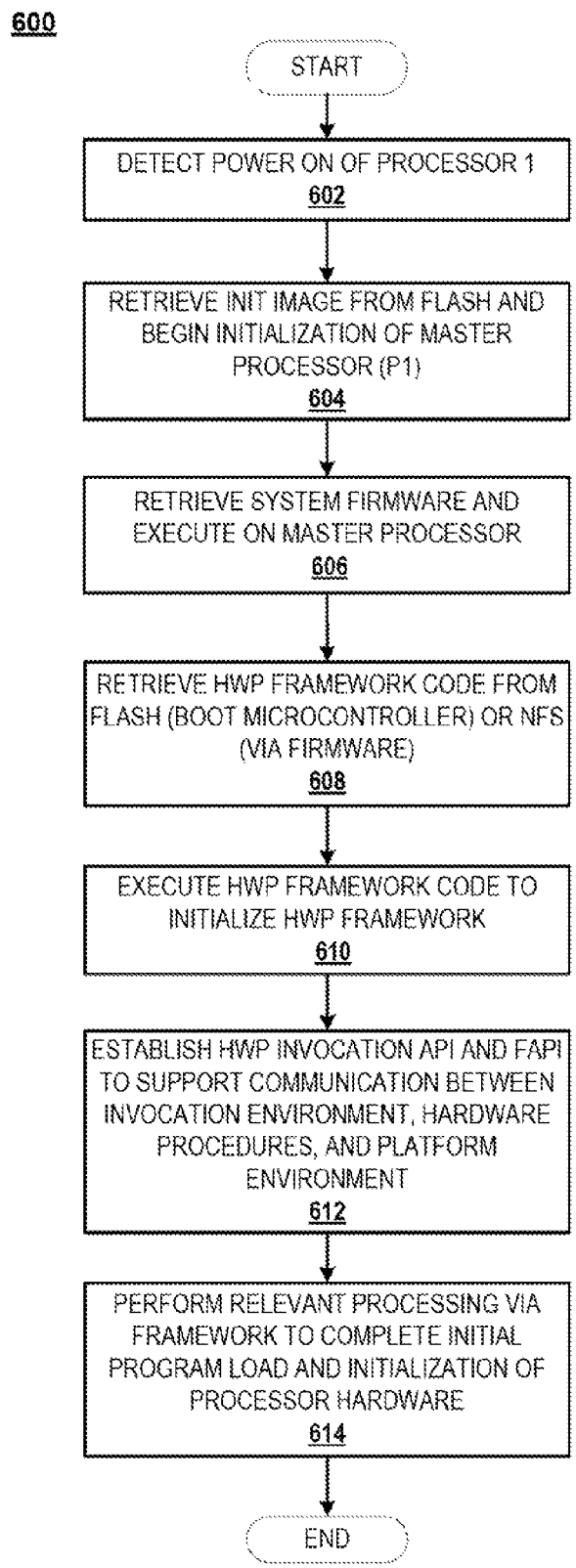
FIG. 6 is a flow chart illustrating one example of a method of implementing a hardware bring up procedure by invoking a HWP framework, according to one or more embodiments.
Figure 7:
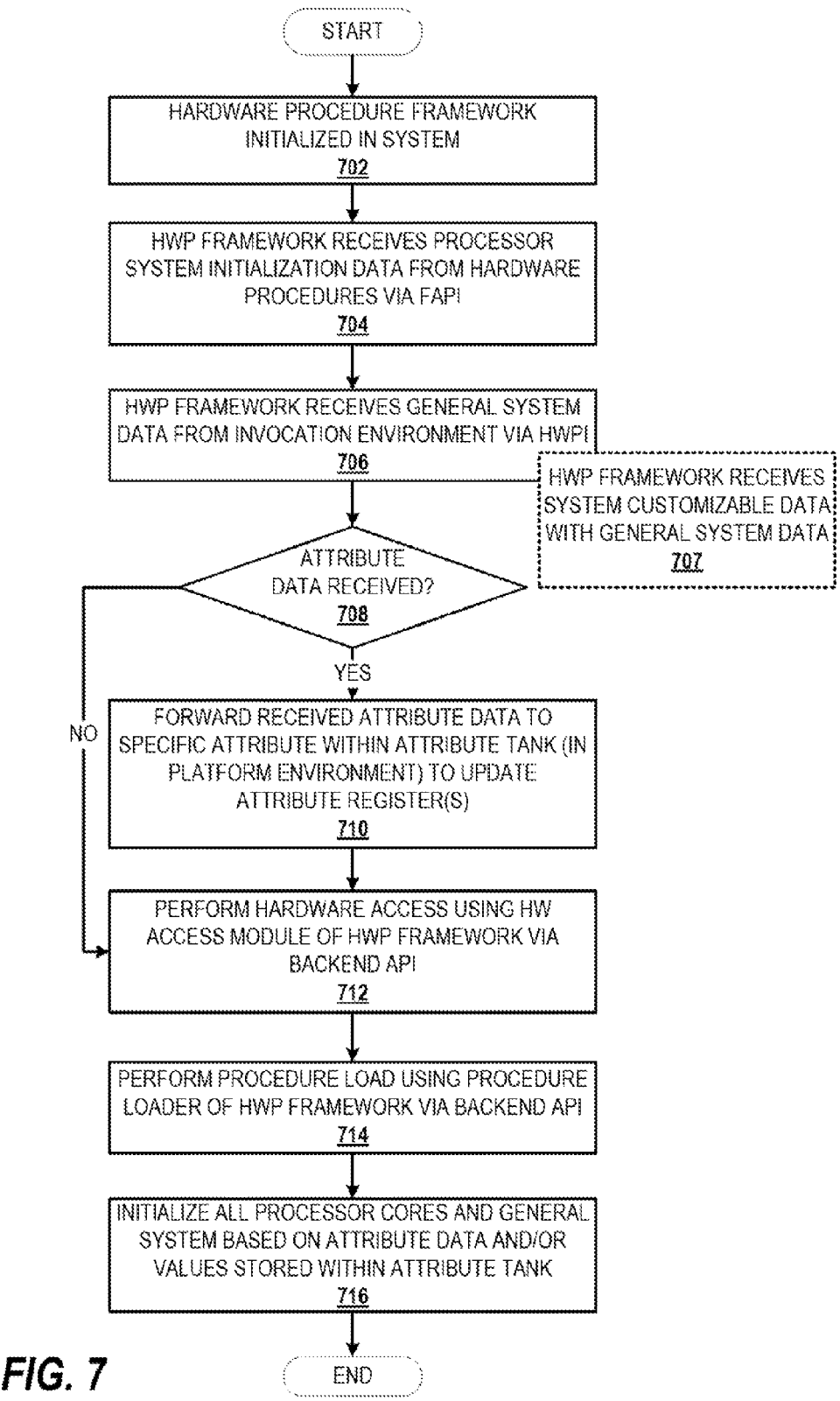
FIG. 7 is a flow chart illustrating one example of a method by which the HWP framework operates during initialization processing and information and data exchanged across the framework, according to one or more embodiments.

Turning now to FIGS. 6 and 7 there are provided flowcharts of exemplary methods for generating and using a hardware procedures framework, according to one or more embodiments. Computer implemented method 600 can be implemented in DPS 100 and involves functions performed by execution of code on at least a first processor 102 (or Service Processor 180). The description of the method is provided with general reference to the specific components illustrated within the preceding figures. Thus, in the discussion of FIGS. 6 and 7, reference is also made to elements described in FIGS. 1-5. Generally the methods are described as being implemented via a processor or processor code 210 and particularly the execution of firmware code 164 as well as HWPF code 182 or HWPF firmware within a processing system. It is, however, appreciated that certain aspects of the described methods may be implemented via other processing devices and/or execution of other code.

Method 600 begins at start block and proceeds to block 602 at which the processor execution environment, such as DPS 100, is powered on. Following power up, method 600 includes a microcontroller retrieving the initialization image from a storage location, such as flash, and initializing a master processor (block 604). Method 600 then includes retrieving system firmware from the execution environment (block 606). The initialization image can include hardware procedures framework code 182 or can be configured to retrieve and execute hardware procedures framework code 182 from one of flash (e.g., NOR flash 150) or a file system on local storage 174 or an NFS 190. With the latter approach, method 600 provides master processor (102) retrieving hardware procedures framework code 182 (block 608) and executing the hardware procedures framework code 182 to initialize hardware procedure framework 220 (block 610). Hardware procedure framework 220 establishes hardware procedure invocation API 205, and framework API (FAPI) 210, and backend API 215 as the mechanisms by which all further communication between hardware procedures, the invocation environment, and the platform environment is accomplished (block 612). Subsequently, all communication associated with the interactions between the processor chipset for initialization of the chipset (and Initial Program Load operations) to support the particular platform is performed via the hardware procedure framework 220 (block 614). The process then ends.

FIG. 7 illustrates a method by which specific operations and data are passed to platform environment utilizing hardware procedure framework 220. Method 700 begins at start block and proceeds to block 702 at which HWP framework 220 is initialized to handle initialization processes associated with processors and processor cores. HWP framework 220 loads the system hardware procedures 225 via framework API 210 (block 704). At block 706, method 700 provides that one or more general system data, which include attribute data values from invocation environment 230 are communicated to and received by HWP framework 220 via HWPI 205. Additionally, in at least one embodiment, system customized data can be generated and inputted to HWP framework 220 along with the general system data (block 707). Method 700 determines at decision block 708 whether any new attribute data has been received. Specifically, the platform environment 240 queries the hardware for items such as SPD or vital product data (VPD) or presence detect. If any attribute data or attribute updates are received (i.e., detection of hardware items), method 700 includes forwarding the received attribute data to the specific attribute within the attribute tank that is maintained in the platform environment (block 710). As illustrated by FIG. 2, the communication with platform environment 240 occurs via backend API 215. At block 712, method 700 includes performing all hardware accesses utilizing the hardware access module 208 of HWP framework 220 and backend API 215. Method 700 also includes performing all procedure loads using the procedure loader 218 of HWP framework 220 and backend API 215. Tracing of platform environment objects is also preformed via backend API 215. Once all of the initialization processes are completed and the attributes have been updated to reflect the configuration data of the system and the hardware being supported, method 700 includes initializing all processor cores and the general system for proper operation utilizing the attribute data and/or attributes stored within the attribute tank (block 716). Method 700 then ends with the processor chips, memory, and I/O being configured through the HWP framework processing to support the particular system environment in which the processor chips are initialized.

According to one embodiment, the data attributes can be stored in flash memory associated with processor. A different version of the data attributes can be stored in the flash memory depending on the type of processor system. For example, a different flash image can be provided based on whether the system is a 4 socket system or 2 socket system, the length of bus wiring, and the types of DIMMs. The invocation environment reads the blueprint of the system from the data attributes and using attributes for each target in the blueprint performs a presence detect. From this information the invocation environment now knows which targets are present and what specific hardware procedure needs to be called on the specific target(s). The hardware procedure operates on a target, such as a chip or core boundary. The target looping process is notified of how many targets there are in the system and collects the targets and calls the hardware procedure on all of the targets. The framework API is a thin layer of code that explains what the hardware procedures can call. Among the functions provided by the FAPI are query information, providing error logging and tracing for debug, and enabling hardware access.

The platform code is not required to know the system layout as all data is queried from the system (via serial presence detect—SPD) or is already contained within the flash image (data attribute tank) that was initially loaded. This data is then pushed into the system by the HWP in the appropriate sequences to initialize the chips.

When vendors/users change the data values they do not need to know the underlying HW register layout. The data is in human readable format and the HWP perform any data splitting, munging, or replication required by the underlying chipset. Thus vendor interface is via the data attributes only.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not be limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R. F, etc., or any suitable combination of the foregoing. Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system comprising:
   at least a first processor having one or more processor cores;
   a storage that is accessible to the first processor during a processor initialization following power up of the data processing system;
   a micro-controller associated with the first processor and which:
   in response to detecting a power-on operation of the first processor, retrieves hardware procedures (HWP) framework code from the storage, wherein the HWP framework code is a single common code set for initializing processors in a plurality of different hardware environments;
   triggers execution of the HWP framework code on the first processor, wherein execution of the HWP framework code generates a HWP framework that comprises a plurality of application programming interfaces (APIs) which govern how all communication processes involving hardware procedures can be accomplished;

performs one or more initialization procedures by communicating attribute data via the HWP framework to configure the first processor for operation within a specific platform environment of the plurality of different hardware environments in which the first processor is to be operated;

queries hardware of the data processing system, wherein the hardware comprises at least one of a processor and an input/output (I/O) device;

in response to querying the hardware:
receives updates to attributes of the attribute data that are associated with the hardware of the data processing system, wherein the updates include at least one of: new attribute data and new attribute updates; and forwards the received updates to a specific attribute within an attribute tank that is maintained in the specific platform environment;

in response to the one or more initialization procedures completing and the received updates being forwarded to the attribute tank, initializes a memory, at least one I/O device, and all processor cores of the data processing system for the specific platform environment using the attribute data and the received updates; and provides an execution environment for invoking procedures, error handling, coalescing system information, and providing hardware access mechanisms via the HWP framework, wherein the HWP framework enables direct updates to hardware procedures and dynamic loading of the direct updates without requiring a new flash image or a patch from firmware.

2. The data processing system of claim 1, wherein the microcontroller retrieving the HWP framework code comprises one of:

retrieving an initialization image from a flash storage associated with the first processor, wherein the initialization image includes both initialization data and the HWP framework code; and retrieving the HWP framework code from a service processor of the data processing system wherein the HWP framework provides an abstraction layer between the specific platform environment and the initialization procedures of processors and processor cores during power up of the system, wherein the HWP framework abstracts away a complexity of performing functions including error handling, performance, configuration, and inputs/outputs (I/O) away from the hardware procedures and encompasses the complexity of system and processor chip interactions.

3. The data processing system of claim 2, wherein:
all inputs and outputs to the hardware procedures are abstracted;
the outputs comprise one or more generic hardware operations and one or more writes to one or more attributes;
the inputs to the HWP framework are introduced as a specific set of attributes comprising a keyed lookup of a name and data;
the outputs utilize the keyed lookup of the name and the data;
the inputs to the framework are introduced as an enumeration value that is indexed within an array;

all of the initialization procedures of the processors and processor cores is abstracted by the abstraction layer;
the chip registers, required data manipulation, and bit splicing is abstracted; and
system and chip interactions within the data processing system are abstracted by the abstraction layer outside of the initialization process.

4. The data processing system of claim 1, wherein the microcontroller retrieving the HWP framework code comprises retrieving the HWP framework code from a network file system on a server that is accessible to the data processing system.

5. The data processing system of claim 1, wherein the hardware procedures are represented as a common code that runs inside the HWP framework and provides hardware-specific logic for controlling some portion of the system hardware, and wherein the hardware procedures code is written once and can be compiled across multiple platform environments.

6. The data processing system of claim 1, wherein the HWP framework enables receipt of external inputs to tweak system settings by updating the attribute data, wherein the updating of the attribute data can occur without requiring any knowledge of bit level details of how the settings/attributes apply to the underlying processor hardware, wherein the processor initialization procedure is data driven, wherein a data driven chip initialization is enabled by allowing data needed to perform an initialization procedure to be placed into an attribute tank.

7. The data processing system of claim 1, wherein the plurality of APIs are stored as a firmware in a non-volatile storage of the data processing system, wherein the HWP framework is initialized prior to the calling of any hardware procedures, and wherein the attribute data includes general system data associated with a general platform environment in which the first processor can be initialized.

8. The data processing system of claim 1, wherein:
the plurality of APIs further comprise a backend API that supports communication of data to the specific platform environment, the communication of data including hardware access, an error database, tracing, attribute definitions, and a procedure loaders;
the received updates are forwarded to the specific platform environment via the backend API, and wherein the hardware is queried for data including at least one of: a serial presence detect (SPD), a vital product data (VPD), and a presence detect and
the hardware includes the memory.

9. The data processing system of claim 1, wherein the attribute data includes: a system definition file, a chip definition file, and system policy data.

10. The data processing system of claim 1, wherein in querying the hardware of the data processing system, the micro-controller:
queries at least one processor core of the processors to retrieve vital product data (VPD) associated with at least one processor core, wherein at least one of the updates to the attributes is associated with the at least one processor core of the processors.

11. A computer program product comprising:
a non-transitory computer readable storage device; and
program code on the non-transitory computer readable storage device that when executed by a processing device of a data processing system within a platform environment triggers the processing device to:
in response to detecting a power-on operation of a first processor, retrieve hardware procedures (HWP)

framework code from the storage, wherein the HWP framework code is a single common code set for initializing processors in a plurality of different hardware environments;

trigger execution of the HWP framework code on the first processor, wherein execution of the HWP framework code generates a HWP framework that comprises a plurality of application programming interfaces (APIs) which govern how all communication processes involving hardware procedures can be accomplished;

perform one or more initialization procedures by communicating attribute data via the HWP framework to configure the first processor for operation within a specific platform environment of the plurality of different hardware environments in which the first processor is to be operated;

querying hardware of the data processing system, wherein the hardware comprises at least one of a processor and an input/output (I/O) device;

in response to querying the hardware:
  receive updates to attributes of the one or more attribute data that are associated with hardware of the data processing system, wherein the updates include at least one of: new attribute data and new attribute updates; and
  forward the received updates to a specific attribute within an attribute tank that is maintained in the specific platform environment;

in response to the one or more initialization procedures completing and the received updates being forwarded to the attribute tank, initialize a memory, at least one I/O device, and all processor cores of the data processing system for the specific platform environment using the attribute data and the received updates; and provide an execution environment for invoking procedures, error handling, coalescing system information, and providing hardware access mechanisms via the HWP framework, wherein the HWP framework enables direct updates to hardware procedures and dynamic loading of the direct updates without requiring a new flash image or a patch from firmware.

12. The computer program product of claim 11, wherein the program code that causes the processing device to retrieve the HWP framework code comprises code that causes the processing device to perform one of:
retrieve an initialization image from a flash storage associated with the first processor, wherein the initialization image includes both initialization data and the HWP framework code; and
retrieve the HWP framework code from a service processor of the data processing system;
wherein the HWP framework provides an abstraction layer between the specific platform environment and the initialization procedures of processors and processor cores during power up of the system, wherein the HWP framework abstracts away a complexity of performing functions including error handling, performance, configuration, and inputs/outputs (I/O) away from the hardware procedures and encompasses the complexity of system and processor chip interactions.

13. The computer program product of claim 12, wherein: all inputs and outputs to the hardware procedures are abstracted;
the outputs comprise one or more generic hardware operations and one or more writes to one or more attributes;
the inputs to the HWP framework are introduced as a specific set of attributes comprising a keyed lookup of a name and data;
the outputs utilize the keyed lookup of the name and the data;
the inputs to the framework are introduced as an enumeration value that is indexed within an array;
all of the initialization procedures of the processors and processor cores is abstracted by the abstraction layer;
the chip registers, required data manipulation, and bit splicing is abstracted; and
system and chip interactions within the data processing system are abstracted by the abstraction layer outside of the initialization process.

14. The computer program product of claim 11, wherein the program code that causes the processing device to retrieve the HWP framework code comprises code that causes the processing device to retrieve the HWP framework code from a network file system on a server that is accessible to the data processing system.

15. The computer program product of claim 11, wherein the hardware procedures are represented as a common code that runs inside the HWP framework and provides hardware-specific logic for controlling some portion of the system hardware, and wherein the hardware procedures code is written once and can be compiled across multiple platform environments.

16. The computer program product of claim 11, wherein the HWP framework enables receipt of external inputs to tweak system settings by updating the attribute data, wherein the updating of the attribute data can occur without requiring any knowledge of bit level details of how the settings/attributes apply to the underlying processor hardware, wherein the processor initialization procedure is data driven, wherein a data driven chip initialization is enabled by allowing data needed to perform an initialization procedure to be placed into an attribute tank.

17. The computer program product of claim 11, wherein the plurality of APIs are stored as a firmware in a non-volatile storage of the data processing system, wherein the HWP framework is initialized prior to the calling of any hardware procedures, and wherein the attribute data includes general system data associated with a general platform environment in which the first processor can be initialized.

18. The computer program product of claim 11, wherein:
the plurality of APIs further comprise a backend API that supports communication of data to the specific platform environment, the communication of data including hardware access, an error database, tracing, attribute definitions, and a procedure loader;
the received updates are forwarded to the specific platform environment via the backend API, and wherein the hardware is queried for data including at least one of: a serial presence detect (SPD), a vital product data (VPD), and a presence detect; and
the hardware includes the memory.

19. The computer program product of claim 11, wherein the attribute data includes: a system definition file, a chip definition file, and system policy data.

20. The computer program product of claim 11, wherein the program code for querying hardware of the data processing system further comprises program code that triggers the processing device to:

query at least one processor core of the processors to retrieve vital product data (VPD) associated with at least one processor core, wherein at least one of the updates to the attributes is associated with the at least one processor core of the processors.

* * * * *